United States Patent
Yun

(10) Patent No.: US 12,079,540 B2
(45) Date of Patent: Sep. 3, 2024

(54) ELECTRONIC DEVICE AND CONTROL METHOD THEREFOR

(71) Applicant: SAMSUNG ELECTRONICS CO., LTD., Suwon-si (KR)

(72) Inventor: Youngsoo Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 17/498,943

(22) Filed: Oct. 12, 2021

(65) Prior Publication Data

US 2022/0027125 A1    Jan. 27, 2022

Related U.S. Application Data

(63) Continuation of application No. PCT/KR2021/000446, filed on Jan. 13, 2021.

(30) Foreign Application Priority Data

Feb. 25, 2020    (KR) .......................... 10-2020-0022900

(51) Int. Cl.
*G06F 3/16*    (2006.01)
*G10L 15/08*    (2006.01)
*G10L 25/63*    (2013.01)

(52) U.S. Cl.
CPC .............. *G06F 3/167* (2013.01); *G10L 15/08* (2013.01); *G10L 25/63* (2013.01); *G10L 2015/088* (2013.01)

(58) Field of Classification Search
CPC ......... G06F 3/167; G10L 15/08; G10L 25/63; G10L 2015/088
See application file for complete search history.

(56) References Cited

U.S. PATENT DOCUMENTS 8,019,602 B2    9/2011    Yu et al.
10,650,816 B2    5/2020    Lee et al.
(Continued)

FOREIGN PATENT DOCUMENTS

JP    2018-159729    10/2018
JP    2019-101291    6/2019
(Continued)

OTHER PUBLICATIONS

Written Opinion dated Apr. 15, 2021 from International Application No. PCT/KR2021/000446.
(Continued)

*Primary Examiner* — Sherrod L Keaton
(74) *Attorney, Agent, or Firm* — STAAS & HALSEY LLP

(57) ABSTRACT

An electronic device to perform an operation corresponding to a first user voice when the first user voice is received through the microphone; store, information about an operation corresponding to the first user voice and user reaction information including the user command when a user command is received through the input unit within the first threshold time from when the first user voice is received, or from when the operation corresponding to the first user voice is performed; perform an operation corresponding to a second user voice when the second user voice is received through the microphone; and provide guide information corresponding to the user command on the basis of the user reaction information stored in the memory when the type of operation corresponding to the first user voice is the same as the type of operation corresponding to the second user voice.

15 Claims, 11 Drawing Sheets

(56) References Cited

U.S. PATENT DOCUMENTS

| | | | |
|---|---|---|---|
| 2005/0177376 A1* | 8/2005 | Cooper | G10L 15/065 |
| | | | 704/277 |
| 2011/0279359 A1* | 11/2011 | McCarty | H04N 21/42203 |
| | | | 345/156 |
| 2013/0117022 A1 | 5/2013 | Chen et al. | |
| 2016/0365088 A1 | 12/2016 | Liang et al. | |
| 2019/0172455 A1 | 6/2019 | Park | |
| 2019/0304460 A1* | 10/2019 | Gunn | G06F 1/3265 |
| 2020/0035244 A1 | 1/2020 | Kim | |
| 2020/0074993 A1 | 3/2020 | Lee et al. | |
| 2020/0118560 A1 | 4/2020 | Kim et al. | |
| 2020/0273462 A1* | 8/2020 | Iwashita | G10L 15/08 |
| 2020/0349939 A1 | 11/2020 | Ryu et al. | |
| 2021/0050005 A1 | 2/2021 | Han et al. | |

FOREIGN PATENT DOCUMENTS

| | | |
|---|---|---|
| JP | 6637604 | 12/2019 |
| KR | 2003-0037103 | 5/2003 |
| KR | 10-2012-0138826 | 12/2012 |
| KR | 10-2018-0071931 | 6/2018 |
| KR | 10-2018-0092914 | 8/2018 |
| KR | 10-2019-0060502 | 6/2019 |
| KR | 10-2019-0061705 | 6/2019 |
| KR | 10-2019-0065821 | 6/2019 |
| KR | 10-2019-0097483 | 8/2019 |
| KR | 10-2019-0107289 | 9/2019 |
| KR | 10-2020-0042127 | 4/2020 |
| WO | 2017/119965 | 7/2017 |

OTHER PUBLICATIONS

International Search Report dated Apr. 15, 2021 from International Application No. PCT/KR2021/000446.

* cited by examiner

ELECTRONIC DEVICE AND CONTROL METHOD THEREFOR

CROSS-REFERENCE TO RELATED APPLICATION

This application is a Continuation of PCT Application No. PCT/KR2021/000446, filed on Jan. 13, 2021 which claims the priority benefit of Korean Application No. 10-2020-0022900, filed on Feb. 25, 2020, the contents of both of which are incorporated by reference herein in their entirety.

BACKGROUND

1. Field

The disclosure relates to an electronic apparatus and a control method therefor, and more particularly, to an electronic apparatus performing an operation according to a user's voice command, and a control method therefor.

2. Description of the Related Art

As technologies are being developed recently, electronic apparatuses equipped with voice assistant platforms are increasing. An electronic apparatus can provide various services through a voice assistant platform. In particular, an electronic apparatus can recommend utterances related to a user's utterance. For example, if a user's utterance is received, an electronic apparatus may provide a list of recommended utterances associated with the previous utterance. Also, an electronic apparatus may provide a list of recommended utterances in further consideration of at least one of the current state of the system, whether an app is being executed, the location, or the change of the network connection state.

However, an electronic apparatus cannot recognize a user's voice command perfectly to 100%. In this case, an electronic apparatus may perform an operation that is not consistent with the user's voice command, or it may not perform any operation.

As a user does not have information about which utterances are supported by an electronic apparatus, in case an electronic apparatus performs an operation that is not consistent with the user's voice command, or does not perform any operation, there is a problem that it is difficult to utter a new voice command.

Also, there is a problem that, in a situation that a problem occurred because an electronic apparatus performed an operation that is not consistent with a user's voice command, or did not perform any operation, the electronic apparatus does not recognize this.

Accordingly, it is necessary that a method for identifying that an electronic apparatus is malfunctioning, and improving this is developed.

SUMMARY

According to an embodiment of the disclosure for achieving the aforementioned purpose, an electronic apparatus includes a microphone, an inputter, a memory, a display, and a processor to connect with the microphone, the inputter, the memory, and the display, wherein the processor is configured to receive a first user voice through the microphone, perform an operation corresponding to the first user voice, and based on receiving a user command through the inputter within a first threshold time from receiving the first user voice or performing the operation corresponding to the first user voice, store information on the operation corresponding to the first user voice and user response information including the received user command in the memory, and receive a second user voice through the microphone, perform an operation corresponding to the second user voice, and based on a type of the operation corresponding to the first user voice and a type of the operation corresponding to the second user voice being identical, control the display to provide guide information corresponding to the user command based on the user response information stored in the memory.

Also, the processor may, based on receiving the second user voice through the microphone within a second threshold time from when the operation corresponding to the first user voice was performed, identify a type of the second user voice, and based on the type of the second user voice being a predetermined type and the user command being received, store the information on the operation corresponding to the first user voice and the user response information including the user command in the memory.

In addition, the processor may, based on receiving the user command after the second user voice of the predetermined type was received, store the information on the operation corresponding to the first user voice and the user response information including the user command in the memory.

Further, the second user voice of the predetermined type may be a user voice including a word indicating a negative emotion.

Also, the processor may control the display to display a content corresponding to the second user voice and display the guide information to be overlaid on the content.

In addition, the processor may stop reproduction of the content while the guide information is displayed.

Further, the processor may, based on receiving the second user voice in a state wherein the number of times that the user response information was stored in the memory is greater than or equal to a predetermined number of times, perform an operation corresponding to the user command.

Also, the guide information may include at least one of a message inducing an operation corresponding to the user command or an item for executing an operation corresponding to the user command.

In addition, the processor may, based on the user command not being received through the inputter within a third threshold time after the guide information was provided, delete the user response information corresponding to the first user voice from the memory.

Further, the electronic apparatus may further include a communication interface, and the processor may, based on receiving the user command, control the communication interface to transmit the information on the operation corresponding to the first user voice and the user command to a server, receive the user response information from the server through the communication interface, and store the received user response information in the memory.

Also, the information on the operation corresponding to the first user voice may include information on a type of an operation that the electronic apparatus will perform based on the first user voice.

Meanwhile, according to an embodiment of the disclosure, a method for controlling an electronic apparatus includes the operation of, based on receiving a first user voice, performing an operation corresponding to the first user voice, based on receiving a user command within a first threshold time from when the first user voice was received or the time point when the operation corresponding to the first user voice was performed, storing information on the operation corresponding to the first user voice and user response information including the user command, based on receiving a second user voice, performing an operation corresponding to the second user voice, and based on a type of the operation corresponding to the first user voice and a type of the operation corresponding to the second user voice being identical, providing guide information corresponding to the user command based on the user response information.

Also, the control method further includes the step of, based on receiving the second user voice within a second threshold time from the time point when the operation corresponding to the first user voice was performed, identifying the type of the second user voice, and in the storing step, based on the type of the second user voice being a predetermined type and the user command being received, the information on the operation corresponding to the first user voice and the user response information including the user command may be stored.

In addition, in the storing step, based on receiving the user command after the second user voice of the predetermined type was received, the information on the operation corresponding to the first user voice and the user response information including the user command may be stored.

Further, the second user voice of the predetermined type may be a user voice including a word indicating a negative emotion.

Also, in the step of performing an operation corresponding to the second user voice, a content corresponding to the second user voice may be displayed, and in the providing step, the guide information may be displayed to be overlaid on the content.

In addition, in the providing step, reproduction of the content may be stopped while the guide information is displayed.

Further, in the providing step, based on receiving the second user voice in a state wherein the number of times that the user response information was stored is greater than or equal to a threshold number of times, an operation corresponding to the user command may be performed.

Also, the guide information may include at least one of a message inducing an operation corresponding to the user command or an item for executing an operation corresponding to the user command.

In addition, the control method may further include the step of, based on a user command not being received within a third threshold time after the guide information was provided, deleting the user response information corresponding to the first user voice.

Further, the storing step may include the steps of, based on receiving the user command, transmitting the information on the operation corresponding to the first user voice and the user command to a server, receiving the user response information from the server, and storing the received user response information.

DETAILED DESCRIPTION

Figure 1:
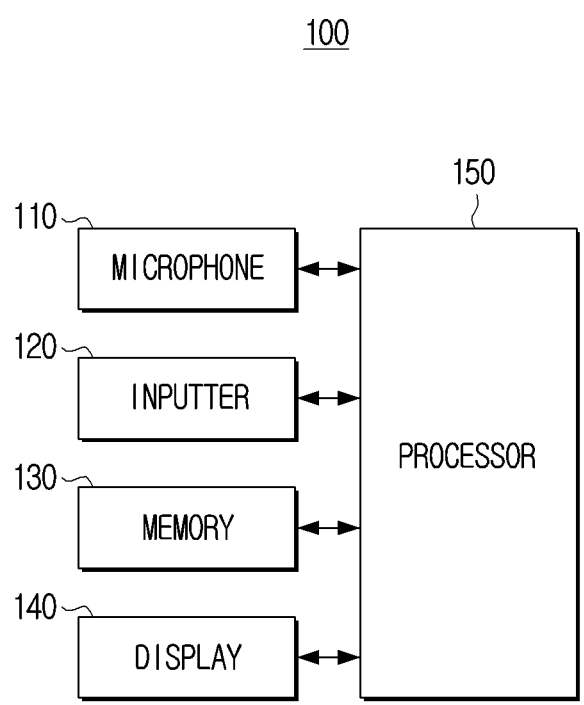
FIG. 1 is a block diagram illustrating a configuration of an electronic apparatus according to an embodiment of the disclosure.

The disclosure is for addressing the aforementioned need, and the purpose of the disclosure is in providing an electronic apparatus which is for identifying whether an operation according to a user's voice command is a malfunction, and improving such a malfunction, and a control method therefor.

According to the various embodiments of the disclosure as described above, an electronic apparatus can improve convenience of a user as it learns a user's response after the user's voice command, and provides guide information based on the learned user's response if the same voice command is input afterwards.

Hereinafter, the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g.: elements such as numbers, functions, operations, and components), and do not exclude the existence of additional characteristics.

In addition, the expression "at least one of A and/or B" should be interpreted to mean any one of "A" or "B" or "A and B."

Further, the expressions "first," "second," and the like used in this specification may describe various elements regardless of any order and/or degree of importance. Also, such expressions are used only to distinguish one element from another element, and are not intended to limit the elements.

Also, singular expressions include plural expressions, as long as they do not obviously mean differently in the context. In addition, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, in this specification, the term "user" may refer to a person who uses an electronic apparatus or an apparatus using an electronic apparatus (e.g.: an artificial intelligence electronic apparatus).

Hereinafter, an embodiment of the disclosure will be described in more detail with reference to the accompanying drawings.

FIG. 1 is a block diagram illustrating a configuration of an electronic apparatus according to an embodiment of the disclosure.

An electronic apparatus 100 may be an apparatus that performs an operation according to a user voice, and it may be an apparatus that includes a display and directly displays an acquired graphic image such as a TV, a desktop PC, a laptop computer, a video wall, a large format display (LFD), digital signage, a digital information display (DID), a projector display, a digital video disk (DVD) player, a smartphone, a tablet PC, a monitor, smart glasses, a smart watch, etc.

Alternatively, the electronic apparatus 100 may be an apparatus that does not include a display such as a set-top box (STB), a speaker, a main body of a computer, etc., and it may be an apparatus that provides a graphic image indicating an operation according to a user voice to a display apparatus. However, the disclosure is not limited thereto, and the electronic apparatus 100 can be any apparatus that performs an operation according to a user voice.

According to FIG. 1, the electronic apparatus 100 includes a microphone 110, an inputter 120, a memory 130, a display 140, and a processor 150. However, the disclosure is not limited thereto, and the electronic apparatus 100 may be implemented in a form wherein some components are excluded.

The microphone 110 is a component for receiving input of a sound and converting the sound into an audio signal. The microphone 110 may be electronically connected to the processor 150, and it may receive a sound by control of the processor 150. Here, a sound may include a user voice and noises around the electronic apparatus 100.

The microphone 110 may be implemented in a form that is integrated with the upper side or the front surface direction, the side surface direction, etc. of the electronic apparatus 100. Alternatively, the microphone 110 may be included in a remote control, etc. separate from the electronic apparatus 100. In this case, the remote control may receive a sound through the microphone 110, and provide the received sound to the electronic apparatus 100.

The microphone 110 may include various components such as a microphone collecting a sound in an analog form, an amp circuit that amplifies the collected sound, an A/D conversion circuit that samples the amplified sound and converts the sound into a digital signal, a filter circuit that removes noise components from the converted digital signal, etc.

The microphone 110 may include a plurality of sub microphones. For example, the microphone 110 may include one sub microphone in each of the front, rear, left, and right directions of the electronic apparatus 100. However, the disclosure is not limited thereto, and the electronic apparatus 100 may include only one microphone 110.

The microphone 110 may also be implemented in a form of a sound sensor.

The inputter 120 is a component that receives a user command. For example, the inputter 120 may be implemented in a form of receiving a control signal from a remote control apparatus as a communication interface. In this case, a user may control the electronic apparatus 100 by a method of inputting a user command through a remote control apparatus.

Here, the communication interface is a component that performs communication with various types of external apparatuses according to various types of communication methods. The communication interface may include at least one of a Wi-Fi module, a Bluetooth module, an infrared communication module, or a wireless communication module. Here, each communication module may be implemented in a form of at least one hardware chip.

A Wi-Fi module and a Bluetooth module perform communication by using a Wi-Fi method and a Bluetooth method, respectively. In the case of using a Wi-Fi module or a Bluetooth module, various types of connection information such as an S SID and a session key is transmitted and received first, and connection of communication is performed by using the information, and various types of information can be transmitted and received thereafter. An infrared communication module performs communication according to an infrared Data Association (IrDA) technology of transmitting data to a near field wirelessly by using infrared rays between visible rays and millimeter waves.

A wireless communication module may include at least one communication chip that performs communication according to various wireless communication standards such as Zigbee, 3rd Generation (3G), 3rd Generation Partnership Project (3GPP), Long Term Evolution (LTE), LTE Advanced (LTE-A), 4th Generation (4G), 5th Generation (5G), etc. other than the aforementioned communication methods.

Other than the above, the communication interface may include at least one of a local area network (LAN) module, an Ethernet module, or a wired communication module performing communication by using a pair cable, a coaxial cable, or an optical fiber cable, etc.

As another example, the inputter 120 may be implemented in a form of directly receiving input of a user command as various types of buttons such as a mechanical button, a touch pad, a wheel, etc. formed in any areas such as the front surface part or the side surface part, the rear surface part, etc. of the exterior of the main body of the electronic apparatus 100.

Alternatively, the inputter 120 may be implemented as a camera and receive a user interaction such as a user's motion. Alternatively, the inputter 120 may be implemented in a form of including the microphone 110. In this case, a user may utter a user voice, and input a user command into the electronic apparatus 100.

Meanwhile, the above example is merely an embodiment, and the inputter 120 can be in any form if it is a form that can receive a user command.

The memory 130 may store user response information. User response information may include information on a user response within a threshold time after there was an operation according to a user voice, and a detailed explanation in this regard will be made later.

The memory 130 may be implemented as a non-volatile memory and a volatile memory, etc., but is not limited thereto. For example, a hard disc may be used instead of the memory 130, and any component is possible if it is a component that can store data.

The display 140 is a component for displaying graphic data. For example, the display 140 is a component that displays guide information corresponding to a user command, and it may be implemented as various forms of displays such as a liquid crystal display (LCD), an organic light emitting diodes (OLED) display, a plasma display panel (PDP), micro LED, a laser display, VR, Glass, etc. Inside the display 140, driving circuits that may be implemented in forms such as an a-si TFT, a low temperature poly silicon (LTPS) TFT, an organic TFT (OTFT), etc., and a backlight unit, etc. may also be included. Meanwhile, the display 140 may be implemented as a touch screen combined with a touch sensor, a flexible display, a 3D display, etc.

The processor 150 controls the overall operations of the electronic apparatus 100. Specifically, the processor 150 may be connected with each component of the electronic apparatus 100 and control the overall operations of the electronic apparatus 100. For example, the processor 150 may be connected with components such as the microphone 110, the inputter 120, the memory 130, the display 140, etc., and control the operations of the electronic apparatus 100.

According to an embodiment of the disclosure, the processor 150 may be implemented as a digital signal processor (DSP), a microprocessor, and a time controller (TCON). However, the disclosure is not limited thereto, and the processor 150 may include one or more of a central processing unit (CPU), a micro controller unit (MCU), a micro processing unit (MPU), a controller, an application processor (AP) or a communication processor (CP), and an ARM processor, or may be defined by the terms. Also, the processor 150 may be implemented as a system on chip (SoC) having a processing algorithm stored therein or large scale integration (LSI), or in the form of a field programmable gate array (FPGA).

If a first user voice is received through the microphone 110, the processor 150 may perform an operation corresponding to the first user voice. For example, if a user voice "Turn on Channel 2" is received, the processor 150 may display Channel 2 to correspond to the user voice.

However, the processor 150 may fail to perform voice recognition or perform voice recognition incorrectly. For example, in case the processor 150 received a user voice "Turn on Channel 2" but did not recognize the voice, the processor 150 may not perform any operation or provide a guide message such as "Please say it again." Alternatively, even though the processor 150 received a user voice "Turn on Channel 2," the processor 150 may identify the voice as "Turn on Channel 1," and display Channel 1. Hereinafter, for the convenience of explanation, it will be explained that the processor 150 identifies the user voice "Turn on Channel 2" as "Turn on Channel 1."

In this case, as a channel that a user wants is not displayed, the user may provide a user command for displaying Channel 2 to the electronic apparatus 100 by a different method. For example, the user may provide a user command for displaying Channel 2 to the electronic apparatus 100 by pushing the No. 2 key of the remote control apparatus. Alternatively, the user may provide the user command to the electronic apparatus 100 by additionally uttering a user voice.

If a user command is received through the inputter 120 within a first threshold time from the time point when the first user voice was received or the time point when an operation corresponding to the first user voice was performed, the processor 150 may store information on the operation corresponding to the first user voice and user response information including the user command in the memory 130. Here, the information on the operation corresponding to the first user voice may include information on a type of an operation that the electronic apparatus 100 will perform based on the first user voice. For example, the processor 150 may perform an operation of changing the channel, an operation of searching a content, an operation of searching a word in the dictionary, etc. according to the first user voice, and in this case, the information on the operation corresponding to the first user voice may include at least one of an operation of changing the channel, an operation of searching a content, or an operation of searching a word in the dictionary.

As a more specific example, if a user command for displaying Channel 2 is received through the inputter 120 within five seconds from the time point when a user voice like "Turn on Channel 2" was received or the time point when the channel was changed to Channel 1 according to a user voice, the processor 150 may store information that Channel 1 was displayed based on the first user voice and user response information including the user command for displaying Channel 2 in the memory 130.

That is, only in case wherein a user command is received within the first threshold time from the time point when the first user voice was received or the time point when an operation corresponding to the first user voice was received, the processor 150 may determine that the operation according to the first user voice has a problem, and store the information as user response information together with the user command in the memory 130.

Here, the processor 150 may match the information on the operation corresponding to the first user voice and the user command, and store them as user response information. That is, the user response information may include a plurality of information pairs.

For example, the user response information may include information that Channel 1 was displayed and a user command for displaying Channel 2 as a first information pair, and include information that Channel 11 was displayed and a user command for displaying Channel 12 as a second information pair, and the user response information may include various kinds of information pairs other than the above.

After the user response information is stored in the memory 130, when a second user voice is received through the microphone, the processor 150 may perform an operation corresponding to the second user voice, and identify whether the type of the operation corresponding to the first user voice and the type of the operation corresponding to the second user voice are identical. Then, if the type of the operation corresponding to the first user voice and the type of the operation corresponding to the second user voice are identical, the processor 150 may control the display 140 to provide guide information corresponding to the user command based on the user response information stored in the memory 130.

In the aforementioned example, if a user voice like "Turn on Channel 2" is received, the processor 150 may recognize this incorrectly and display Channel 1. Then, the processor 150 may identify whether the operation of displaying Channel 1 is the operation corresponding to the first user voice stored in the user response information. That is, if it is identified that the operation of displaying Channel 1 is information stored in the user response information, the processor 150 may control the display 140 to provide guide information corresponding to the user command for displaying Channel 2.

Here, the guide information may include at least one of a message inducing an operation corresponding to the user command or an item for executing an operation corresponding to the user command. In the aforementioned example, the guide information may include at least one of a message like "Display Channel 2" or an item indicating "Channel 2." The user may utter a user voice identical to the message and change Channel 1 to Channel 2. Alternatively, the user may change Channel 1 to Channel 2 by selecting the item through a remote control apparatus, etc.

Meanwhile, so far, it was described that the user response information is stored in the memory 130 in case a user command is received within the first threshold time from the time point when the first user voice was received or the time point when an operation corresponding to the first user voice was performed, but this is merely an embodiment.

For example, if the second user voice is received through the microphone 110 within the second threshold time from the time point when the operation corresponding to the first user voice was performed, the processors 150 may identify the type of the second user voice, and if the type of the second user voice is a predetermined type and a user command is received, the processor 150 may store the information on the operation corresponding to the first user voice and the user response information including the user command in the memory 130.

That is, in case the second user voice of the predetermined type was additionally received within the second threshold time from the time point when the first user voice was received, the processor 150 may store the user response information in the memory 130.

In particular, if a user command is received after the second user voice of the predetermined type was additionally received, the processor 150 may store the information on the operation corresponding to the first user voice and the user response information including the user command in the memory 130. In this case, the first threshold time is bigger than the second threshold time.

However, the disclosure is not limited thereto, and in case the first threshold time is smaller than the second threshold time, the user response information may also be stored in the memory 130. For example, if the second user voice of the predetermined type is received after a user command was received, the processor 150 may store the information on the operation corresponding to the first user voice and the user response information including the user command in the memory 130.

The second user voice of the predetermined type may be a user voice including a word indicating a negative emotion. For example, the second user voice may be a user voice including a word indicating a negative emotion such as "It doesn't work well," "No, not that," etc.

Meanwhile, the processor 150 may control the display 140 to display a content corresponding to the second user voice and display the guide information to be overlaid on the content.

In the aforementioned example, the processor 150 may control the display 140 to display a content provided on Channel 1, and display guide information such as a message like "Display Channel 2" or an item indicating "Channel 2" to be overlaid on the content. In this case, the processor 150 may stop reproduction of the content while the guide information is displayed.

Meanwhile, so far, a case wherein the number of times that a user command is received within the first threshold time from the time point when the first user voice was received or the time point when the operation corresponding to the first user voice was performed is one was assumed. However, such a malfunction may be repeated several times, and the processor 150 may additionally store the number of times of the same user response information in the memory 130.

Then, if the second user voice is received in a state wherein the number of times that the same user response information is stored in the memory 130 is greater than or equal to a threshold number of times, the processor 150 may perform an operation corresponding to the user command. In this case, the processor 150 may not perform an operation of providing guide information.

If a user command is not received through the inputter 120 within a third threshold time after the guide information is provided, the processor 150 may delete the user response information corresponding to the first user voice from the memory 130. However, the disclosure is not limited thereto, and only in case wherein the number of times that a user command is not received within the third threshold time after the guide information is provided is greater than or equal to the threshold number of times, the user response information corresponding to the first user voice may be deleted.

So far, it was described that the electronic apparatus 100 directly acquires user response information, but the disclosure is not limited thereto. For example, the electronic apparatus 100 may further include a communication interface, and when a user command is received, the processor 150 may control the communication interface to transmit the information on the operation corresponding to the first user voice and the user command to a server, receive user response information from the server though the communication interface, and store the received user response information in the memory 130.

In this case, the server may collect various user response information not only from the electronic apparatus 100 but also from a plurality of other electronic apparatuses.

As described above, the electronic apparatus 100 may learn a user's response after the user's voice command, and if the same voice command is input afterwards, the electronic apparatus 100 may provide guide information based on the learned user's response.

Hereinafter, the operation of the electronic apparatus 100 will be described in more detail through the drawings.

Figure 2A:
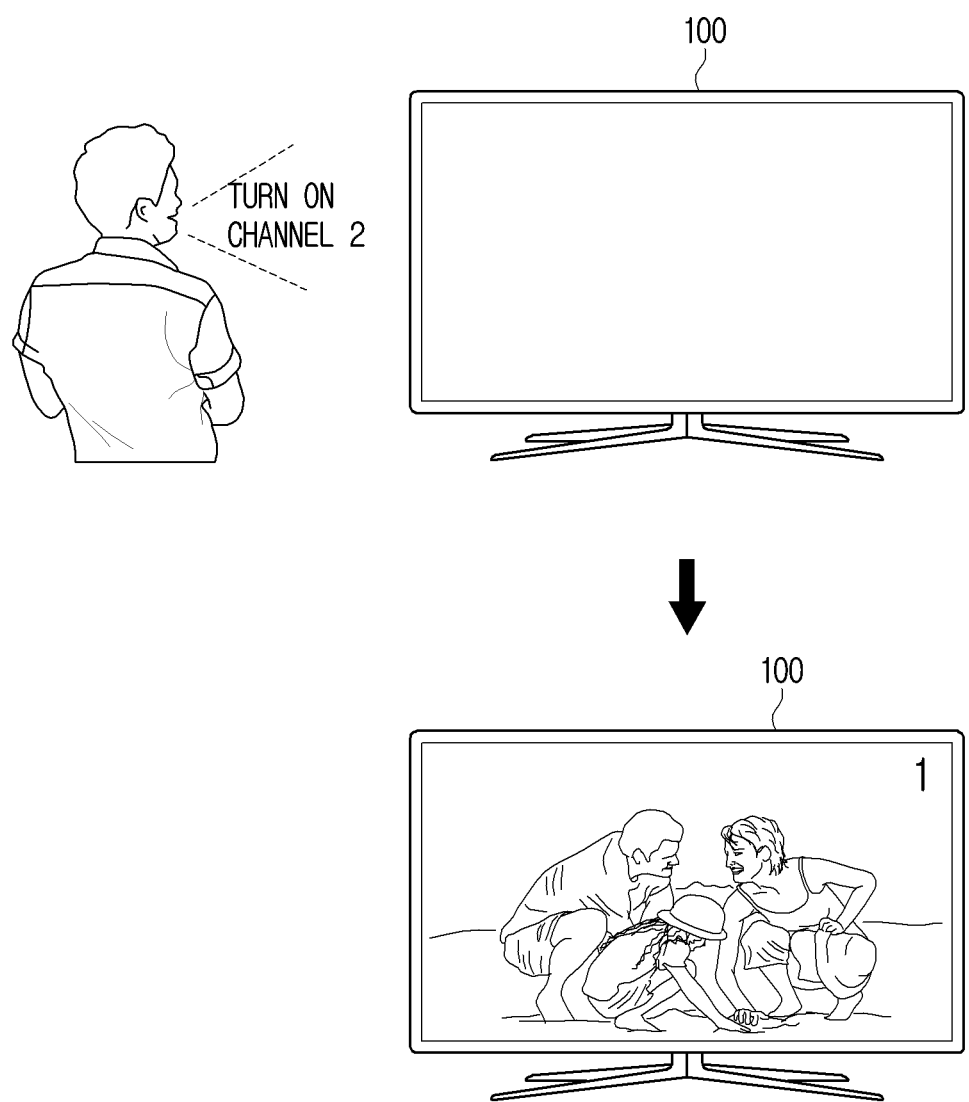
FIG. 2A and FIG. 2B are diagrams for illustrating learning operations according to an embodiment of the disclosure.
Figure 2B:
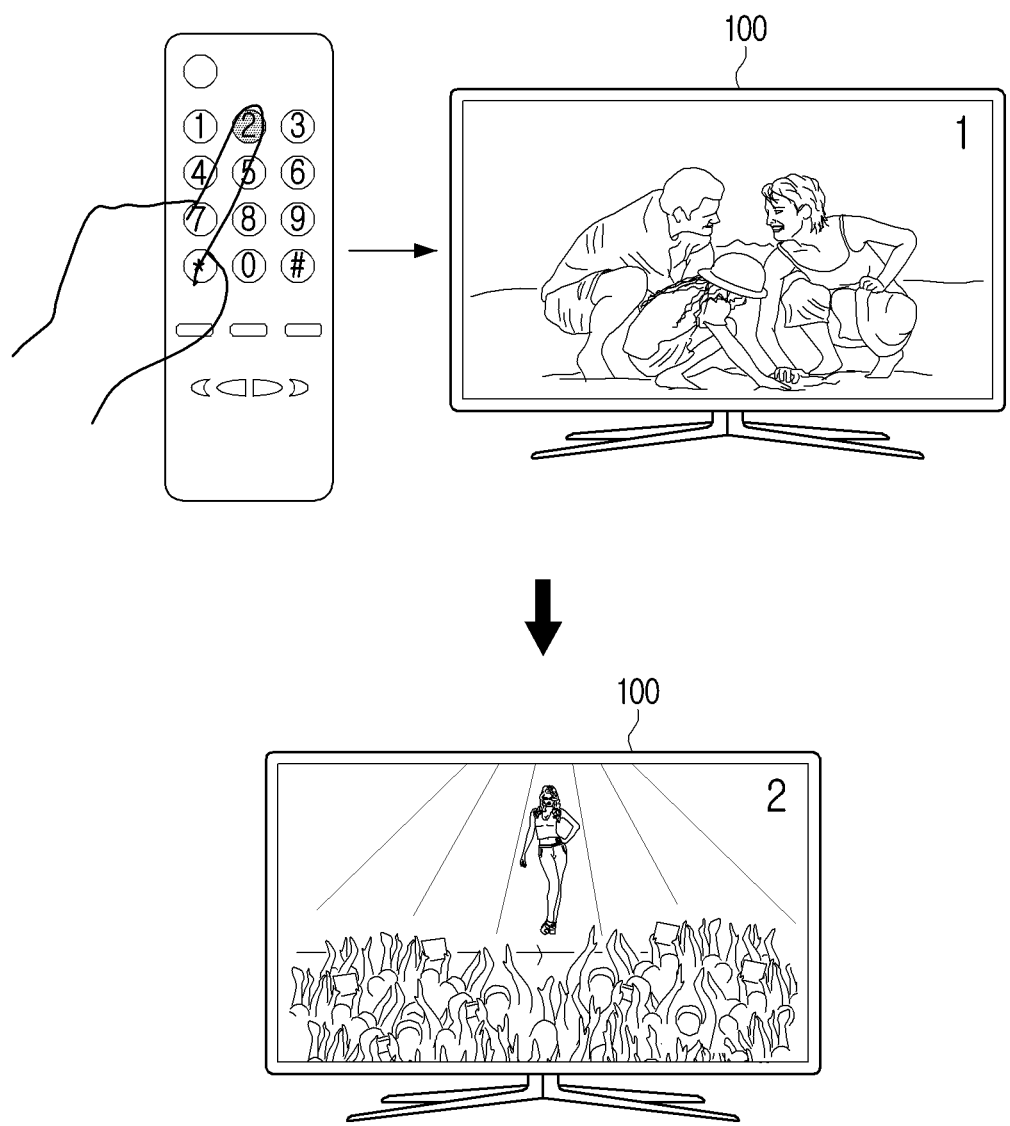

FIG. 2A and FIG. 2B are diagrams for illustrating learning operations according to an embodiment of the disclosure.

First, as illustrated in FIG. 2A, the processor 150 may receive the first user voice like "Turn on Channel 2" through the microphone 110. Meanwhile, the processor 150 may recognize this incorrectly and display Channel 1.

As illustrated in FIG. 2B, if a control command for displaying Channel 2 is received from a remote control apparatus within the first threshold time from the time point when the first user voice was received or the time point when the operation corresponding to the first user voice was performed, the processor 150 may display Channel 2 first.

Then, the processor 150 may store information that Channel 1 was displayed based on the first user voice and user response information including a control command for displaying Channel 2 in the memory 130.

Here, the processor 150 may not store the first user voice itself as user response information. This is because, if the first user voice like "Turn on Channel 2" and a control command for displaying Channel 2 are matched and stored as user response information, for example, the processor 150 cannot identify the user voice "Turn on Channel 2." For example, if a user voice like "Channel 2" or "Turn on Channel 2" is input, the processor 150 may not identify corresponding user response information. Accordingly, the processor 150 may match the operation according to the first user voice but not the first user voice itself with the user command and store them as user response information.

Figure 3A:
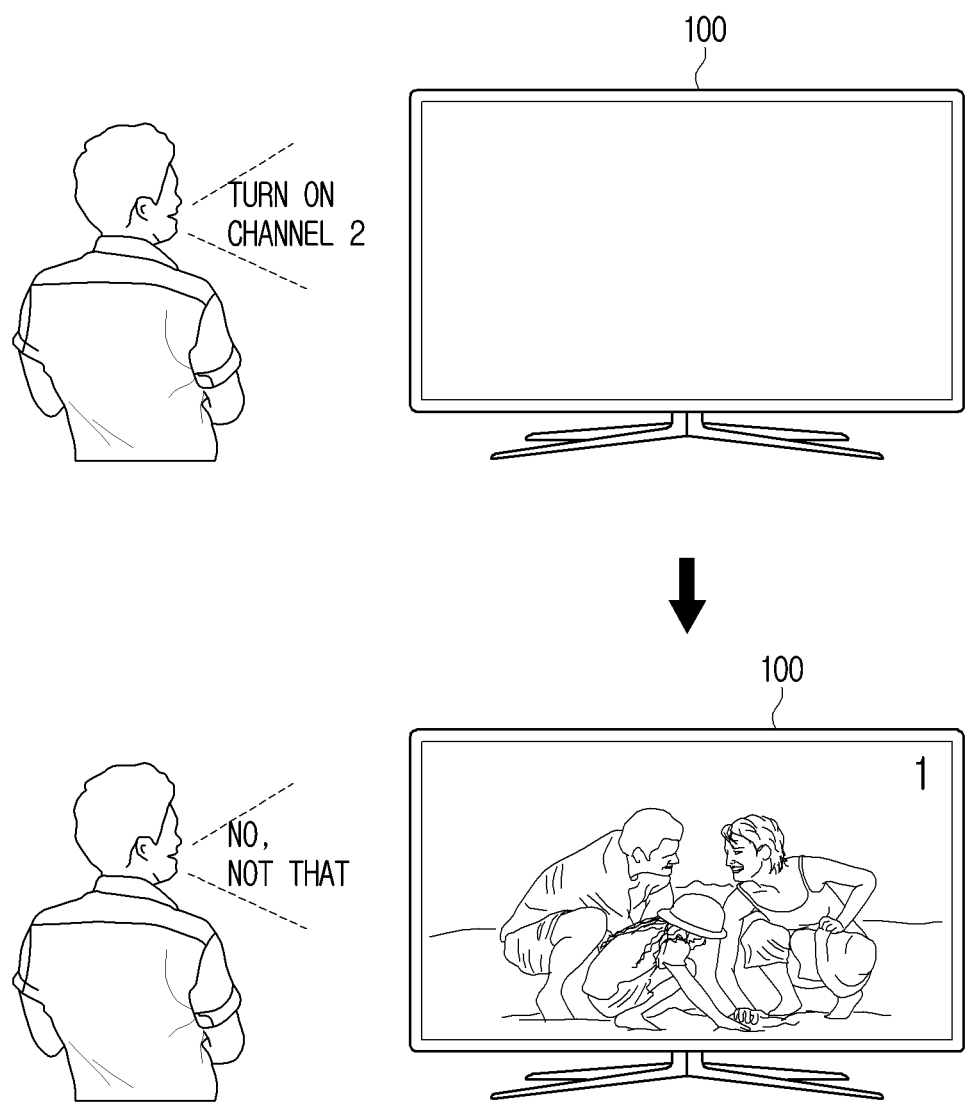
FIG. 3A and FIG. 3B are diagrams for illustrating learning operations according to another embodiment of the disclosure.
Figure 3B:
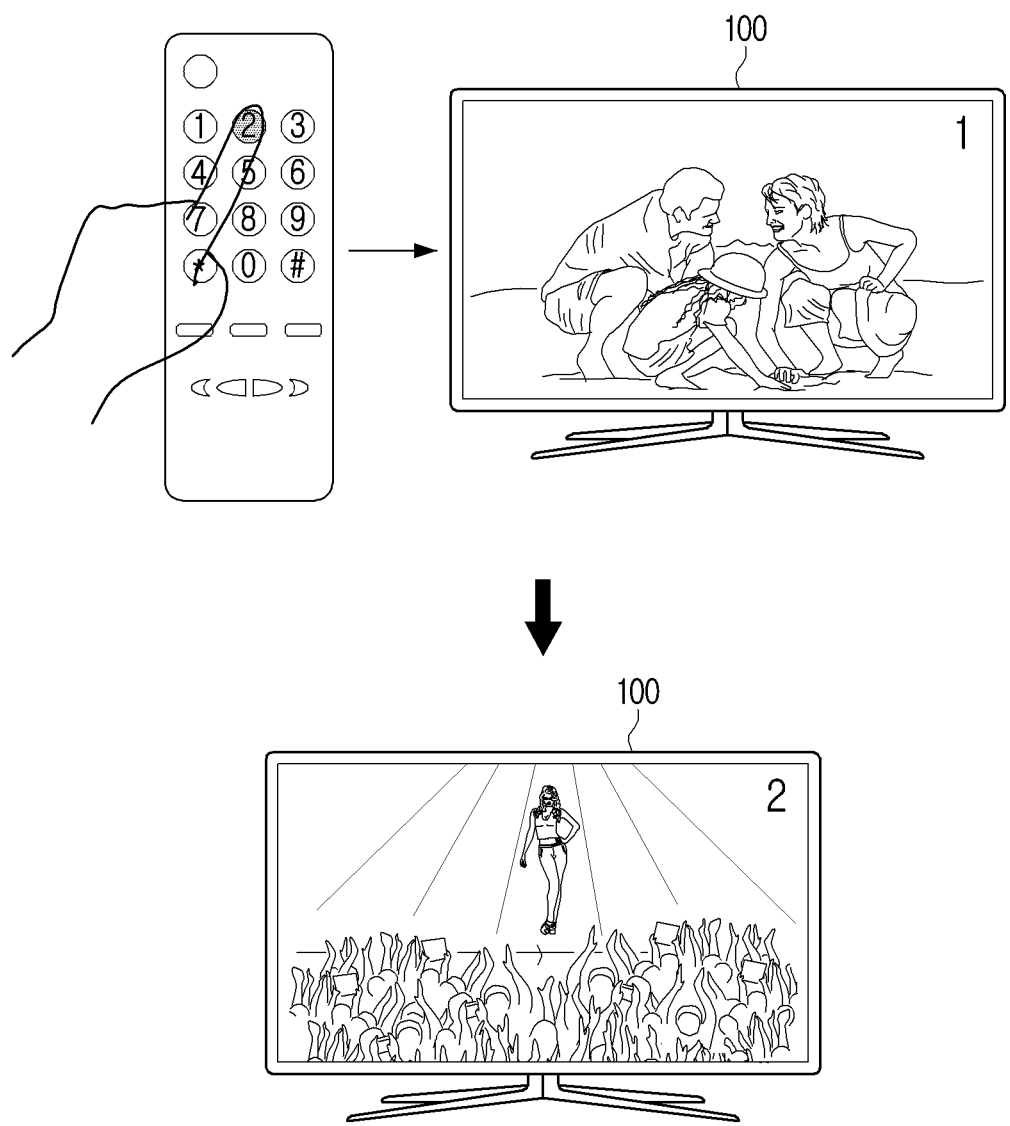

FIG. 3A and FIG. 3B are diagrams for illustrating learning operations according to another embodiment of the disclosure.

First, as illustrated in FIG. 3A, the processor 150 may receive the first user voice like "Turn on Channel 2" through the microphone 110. Meanwhile, the processor 150 may recognize this incorrectly and display Channel 1.

Then, the processor 150 may receive the second user voice like "No, not that" through the microphone 110 within the second threshold time from the time point when the operation corresponding to the first user voice was performed, and identify that the second user voice includes a word indicating a negative emotion.

As illustrated in FIG. 3B, if the second user voice includes a word indicating a negative emotion, and a control command for displaying Channel 2 is received from a remote control apparatus within the first threshold time from the time point when the first user voice was received or the time point when the operation corresponding to the first user voice was performed, the processor 150 may display Channel 2 first.

Then, the processor 150 may store information that Channel 1 was displayed based on the first user voice and user response information including the control command for displaying Channel 2 in the memory 130.

That is, after performing the operation corresponding to the first user voice, in case there is a negative response of the user, and a user command is received, the processor 150 may store user response information.

In this case, reliability of the user response information can be improved more than the cases of FIG. 2A and FIG. 2B.

Figure 4A:
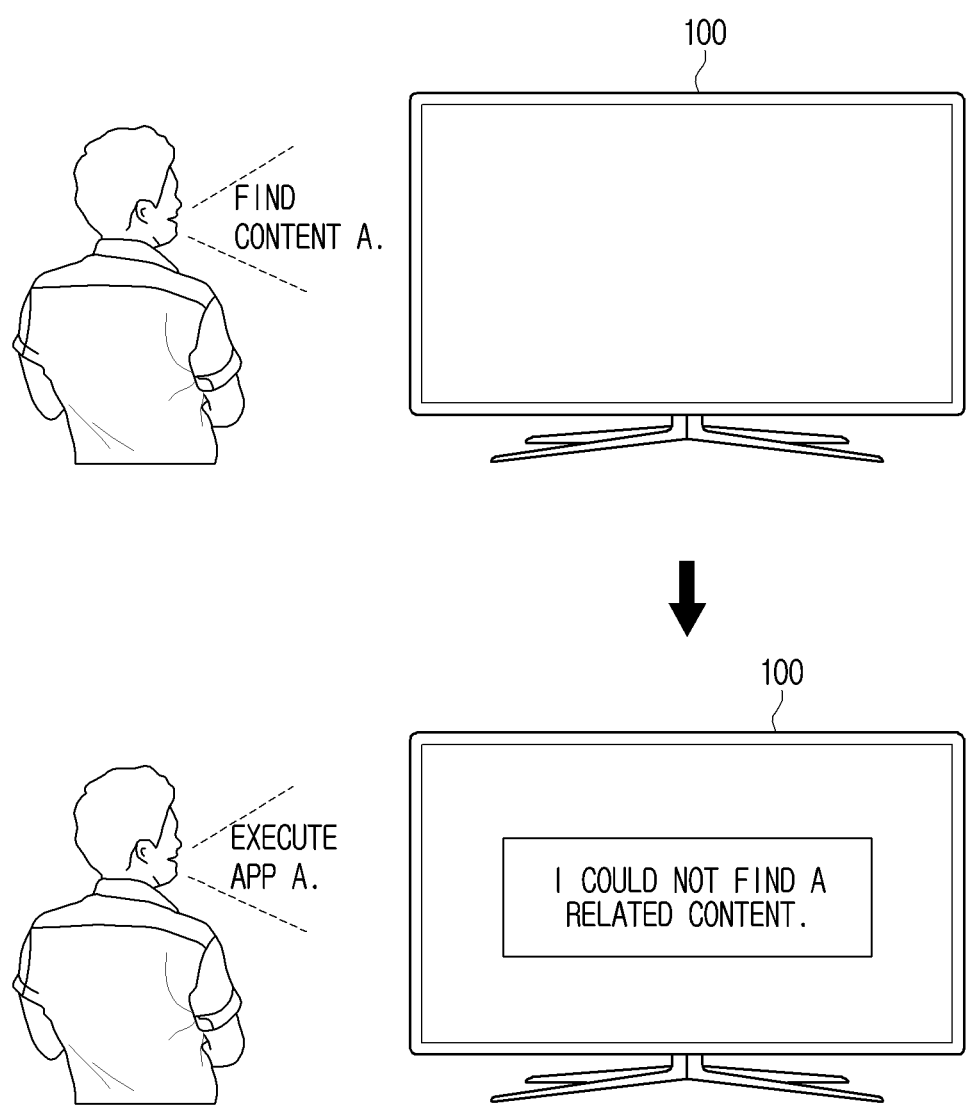
FIG. 4A and FIG. 4B are diagrams for illustrating learning operations for various user voices according to an embodiment of the disclosure.
Figure 4B:
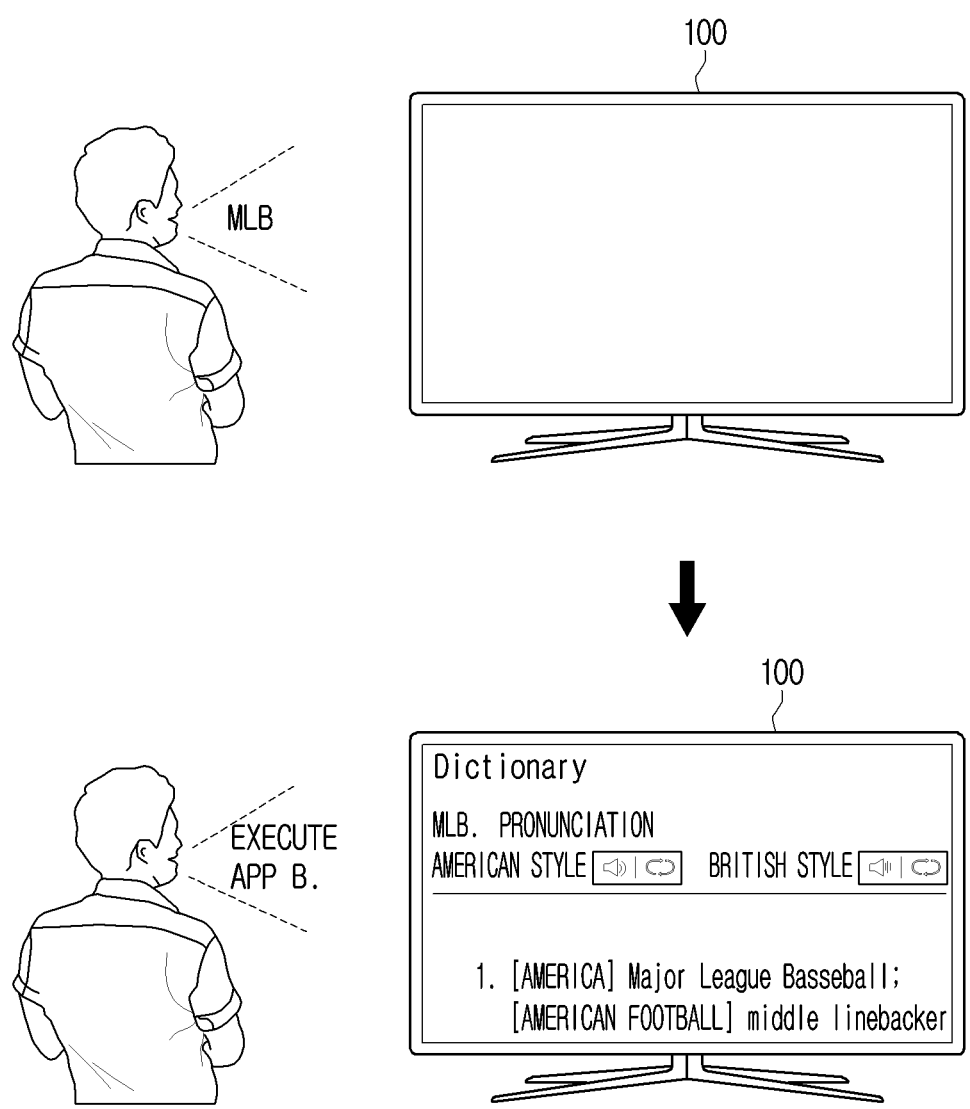

In FIG. 2A to FIG. 3B, a case wherein a user uttered a user voice for changing the channel was described. In FIG. 4A and FIG. 4B, learning operations of the processor 150 according to more various user voices will be described.

FIG. 4A and FIG. 4B are diagrams for illustrating learning operations for various user voices according to an embodiment of the disclosure.

First, as illustrated in the upper part of FIG. 4A, the processor 150 may receive a first user voice like "Search the content A" through the microphone 110.

As illustrated in the lower part of FIG. 4A, a search result for the content A may not be identified, and the processor 150 may display a guide message like "I could not find a related content." That is, the processor 150 may not provide a result that the user wants. This may be a case wherein a database where the processor 150 performed a search is wrong. For example, in a database A, information on the content A may be stored, and in a database B, information on the content A may not be stored, and in case the processor 150 performed a search only in the database B, the search result may not be identified.

Then, the processor 150 may receive a second user voice like "Execute App A" through the microphone 110 within the first threshold time from the time point when the first user voice was received or the time point when the operation corresponding to the first user voice was performed. In this case, the processor 150 may execute the App A, and store information on the searching operation of the content based on the first user voice and user response information including the execution command for the App A in the memory 130.

In FIG. 4A, a case wherein a search for the content A is impossible is illustrated, but the disclosure is not limited thereto. For example, the processor 150 may perform a search for the content A in an App A', and display the searched result in the App A'. Here, the App A' is an application that provides an introduction video for the content A, and the user may want to execute the App A providing the content A itself. After displaying the searched result in the App A', the processor 150 may receive a second user voice like "Execute the App A." In this case, the processor 150 may execute the App A, and store information on the searching operation of the content based on the first user voice and user response information including the execution command for the App A in the memory 130.

Alternatively, as illustrated in the upper part of FIG. 4B, the processor 150 may receive a first user voice like "MLB" through the microphone 110.

As illustrated in the lower part of FIG. 4B, the processor 150 may search information on the MLB in the dictionary, and display the search result. The user may have had an intention of viewing a sport channel related to the MLB, but the processor 150 may be in a state of having searched only the dictionary meaning, and not having provided a result that the user wants.

The processor 150 may receive a second user voice like "Execute App B" through the microphone 110 within the first threshold time from the time point when the first user voice was received or the time point when the operation corresponding to the first user voice was performed. The App B may be an application that provides various broadcasting channels.

In this case, the processor 150 may execute the App B, and store information on the operation of searching the word in the dictionary based on the first user voice and user response information including the execution command for the App B in the memory 130.

As described above, in case an operation that a user wants was not performed, the processor 150 may identify the user's response, and store this as user response information in the memory 130.

Figure 5:
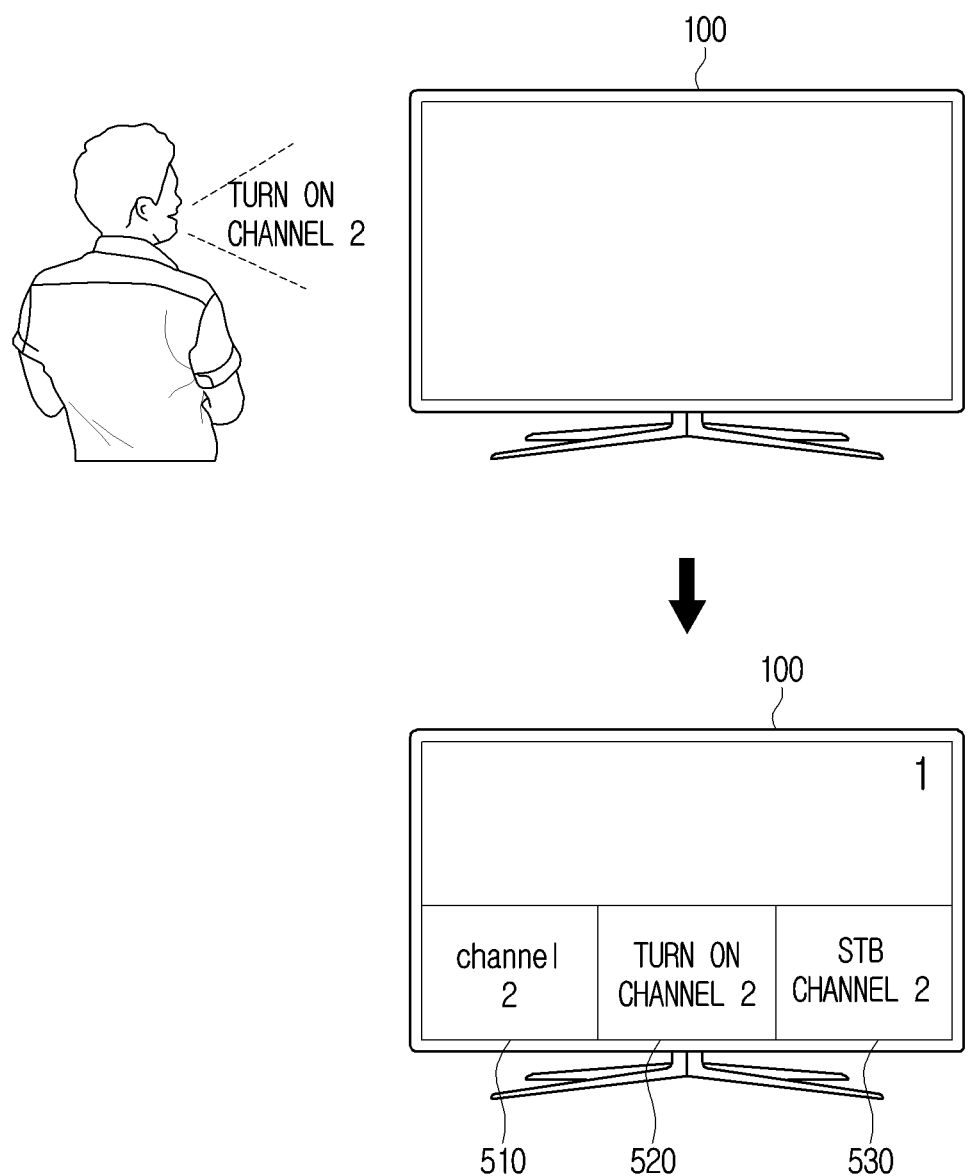
FIG. 5 is a diagram for illustrating an operation according to user response information according to an embodiment of the disclosure.

FIG. 5 is a diagram for illustrating an operation according to user response information according to an embodiment of the disclosure. FIG. 5 assumes a case wherein the user response information described in FIG. 2A to FIG. 3B is stored. That is, it is described that the user response information includes information that Channel 1 was displayed based on the first user voice and a control command for displaying Channel 2.

As illustrated in FIG. 5, if a second user voice like "Turn on Channel 2" is received through the microphone 110, the processor 150 may perform an operation corresponding to the second user voice. Here, the operation corresponding to the second user voice may also be an operation of displaying Channel 1 by misrecognition. In case the processor 150 recognized the second user voice correctly and displays Channel 2, the user response information may not include information that Channel 2 was displayed, and thus the processor 150 may not perform an additional operation.

If the type of the operation corresponding to the first user voice and the type of the operation corresponding to the second user voice are identical, the processor 150 may provide guide information corresponding to the user command based on the user response information stored in the memory 130. The guide information may include at least one of an item 510 like "Channel 2," a message 520 like "Turn on Channel 2," or an item 530 like "STB Channel 2."

Meanwhile, in the above, it was described that both of the first user voice in FIG. 2A to FIG. 3B and the second user voice in FIG. 5 are "Turn on Channel 2," but only the first user voice in FIG. 2A to FIG. 3B may be "Turn on Channel 2," and the second user voice in FIG. 5 may be "Turn on No.

2." Here, in case the processor 150 misrecognizes the second user voice like "Turn on No. 2" and displays Channel 1, the same guide information as described above may be provided. That is, in case the first user voice and the second user voice are different, but operations according to the voices are identical, the processor 150 may provide the same guide information. This is because the processor 150 stores an operation according to the first user voice but not the first user voice itself as user response information. Alternatively, if the processor 150 does not misrecognize the second user voice like "Turn on No. 2" and displays Channel 2, there will be no problem, and the processor 150 may not perform an additional operation.

Alternatively, only the first user voice in FIG. 2A to FIG. 3B may be "Turn on Channel 2," and the second user voice in FIG. 5 may be "Turn on Channel 12." Here, the processor 150 may misrecognize the second user voice like "Turn on Channel 12" and display Channel 1. In this case, the processor 150 may provide guide information as in the lower part of FIG. 5, but this is irrelevant to Channel 12 that the user wants. Meanwhile, such guide information is just displayed simply, and if a user command is not input during a specific time, the guide information disappears, and thus the user's inconvenience can be minimized.

Figure 6:
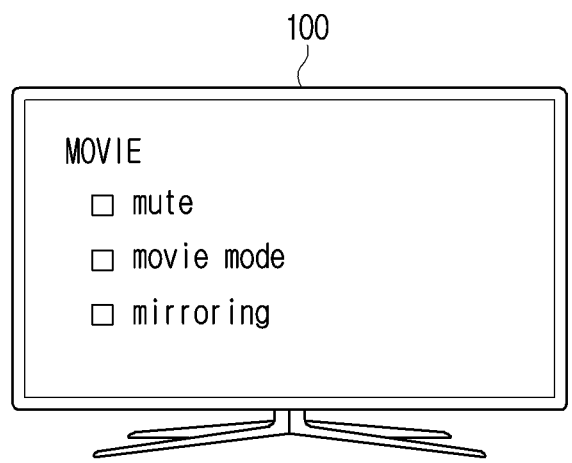
FIG. 6 is a diagram for illustrating a user setting operation according to an embodiment of the disclosure.

FIG. 6 is a diagram for illustrating a user setting operation according to an embodiment of the disclosure. The user setting screen in FIG. 6 assumes a case wherein a mute command was received after the first user voice was received, a case wherein a movie mode command was received after the first user voice was received, and a case wherein user response information was generated according to a case wherein a mirroring command was received after the first user voice was received.

As illustrated in FIG. 6, the processor 150 may provide a user setting screen. For example, on one side surface of the screen in FIG. 5, an icon for displaying a user setting screen may be provided, and a user may select this and may be provided with a screen as in FIG. 6.

Then, in case one of the menus provided on the user setting screen in FIG. 6 is selected, and a user voice making the same operation as the first user voice performed is received afterwards, the processor 150 may perform an operation according to the selected function without providing guide information.

Figure 7:
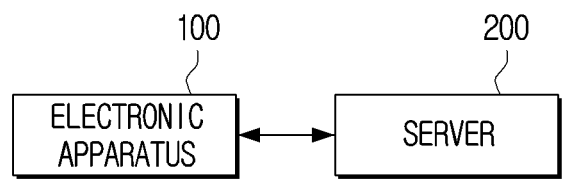
FIG. 7 is a diagram for illustrating an advantage of using a server according to an embodiment of the disclosure.

FIG. 7 is a diagram for illustrating an advantage of using the server 200 according to an embodiment of the disclosure.

As illustrated in FIG. 7, the processor 150 may manage user response information by performing communication with the server 200.

For example, if a user command is received within the first threshold time from the time point when the first user voice was received or the time point when an operation corresponding to the first user voice was performed, the processor 150 may transmit information on the operation corresponding to the first user voice and the user command to the server 200, receive user response information from the server 200, and store the received user response information in the memory 130. Afterwards, when a second user voice is received, the processor 150 may perform an operation corresponding to the second user voice, and if the type of the operation corresponding to the first user voice and the type of the operation corresponding to the second user voice are identical, the processor 150 may provide guide information corresponding to the user command based on the user response information stored in the memory 130.

Alternatively, if a user command is received within the first threshold time from the time point when the first user voice was received or the time point when an operation corresponding to the first user voice was performed, the processor 150 may transmit information on the operation corresponding to the first user voice and the user command to the server 200. The server 200 may acquire the information on the operation corresponding to the first user voice and user response information including the user command. Afterwards, when a second user voice is received, the processor 150 may perform an operation corresponding to the second user voice, and store information on the operation corresponding to the second user voice to the server 200. The server 200 may identify whether the operation corresponding to the second user voice is stored as user response information, and in case the operation is stored, the server 200 may identify a user command that was matched with the operation corresponding to the second user voice and stored, and transmit guide information corresponding to the identified user command to the electronic apparatus 100. The processor 150 may provide the received guide information.

Figure 8:
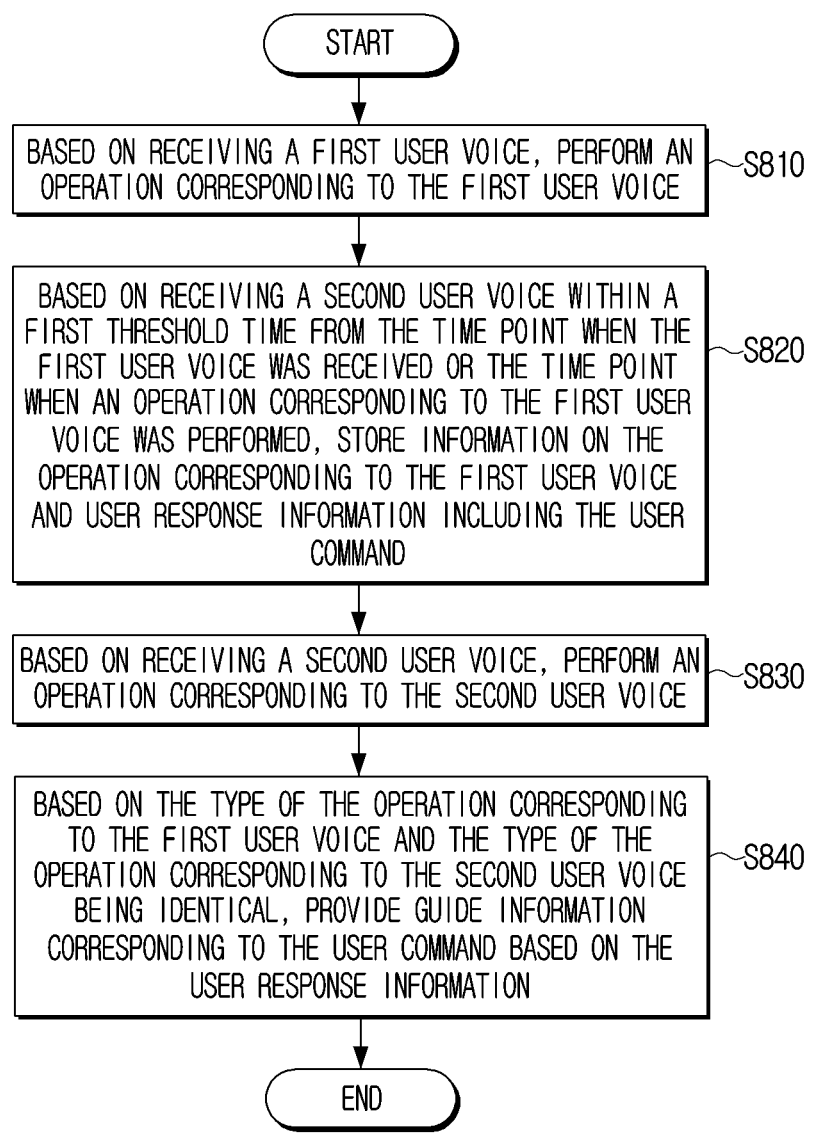
FIG. 8 is a flow chart for illustrating a method for controlling an electronic apparatus according to an embodiment of the disclosure.

FIG. 8 is a flow chart for illustrating a method for controlling an electronic apparatus according to an embodiment of the disclosure.

First, based on receiving a first user voice, an operation corresponding to the first user voice is performed in operation S810. Then, based on receiving a user command within a first threshold time from the time point when the first user voice was received or the time point when an operation corresponding to the first user voice was performed, information on the operation corresponding to the first user voice and user response information including the user command are stored in operation S820. Then, based on receiving a second user voice, an operation corresponding to the second user voice is performed in operation S830. Then, based on the type of the operation corresponding to the first user voice and the type of the operation corresponding to the second user voice being identical, guide information corresponding to the user command is provided based on the user response information in operation S840.

Here, the control method further includes the step of, based on receiving a second user voice within a second threshold time from the time point when the operation corresponding to the first user voice was performed, identifying the type of the second user voice, and in the storing operation S820, based on the type of the second user voice being a predetermined type and the user command being received, the information on the operation corresponding to the first user voice and the user response information including the user command may be stored.

Then, in the storing operation S820, based on receiving the user command after the second user voice of the predetermined type was received, the information on the operation corresponding to the first user voice and the user response information including the user command may be stored.

Here, the second user voice of the predetermined type may be a user voice including a word indicating a negative emotion.

Meanwhile, in the operation S830 of performing an operation corresponding to the second user voice, a content corresponding to the second user voice may be displayed, and in the providing operation S840, the guide information may be displayed to be overlaid on the content.

Here, in the providing operation S840, reproduction of the content may be stopped while the guide information is displayed.

Meanwhile, in the providing operation S840, based on receiving the second user voice in a state wherein the number of times that the user response information was stored is greater than or equal to a threshold number of times, an operation corresponding to the user command may be performed.

Also, the guide information may include at least one of a message inducing an operation corresponding to the user command or an item for executing an operation corresponding to the user command.

Meanwhile, the control method may further include the step of, based on a user command not being received within a third threshold time after the guide information was provided, deleting the user response information corresponding to the first user voice.

Further, the storing operation S820 may include the steps of, based on receiving the user command, transmitting the information on the operation corresponding to the first user voice and the user command to a server, receiving the user response information from the server, and storing the received user response information.

According to the various embodiments of the disclosure as described above, an electronic apparatus can improve convenience of a user as it learns a user's response after the user's voice command, and provides guide information based on the learned user's response if the same voice command is input afterwards.

Meanwhile, according to an embodiment of the disclosure, the aforementioned various embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments (e.g.: an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the method according to the aforementioned various embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™) In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the aforementioned various embodiments may be implemented in a recording medium that can be read by a computer or an apparatus similar to a computer, by using software, hardware, or a combination thereof. In some cases, the embodiments described in this specification may be implemented as a processor itself. According to implementation by software, the embodiments such as processes and functions described in this specification may be implemented as separate software modules. Each of the software modules can perform one or more functions and operations described in this specification.

Meanwhile, computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine. A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Also, each of the components (e.g.: a module or a program) according to the aforementioned various embodiments may be comprised of a single entity or a plurality of entities, and some sub-components among the aforementioned sub-components may be omitted, or different sub-components may be further included in the various embodiments. Alternatively or additionally, some components (e.g.: modules or programs) may be integrated into one entity to perform the same or similar functions performed by each component prior to integration. Operations performed by a module, a program, or another component, in accordance with the various embodiments, may be performed sequentially, in parallel, repetitively, or in a heuristic manner, or at least some operations may be performed in a different order, omitted, or a different operation may be added.

So far, preferred embodiments of the disclosure have been shown and described, but the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
a microphone;
an inputter;
a memory;
a display; and
a processor to communicate with the microphone, the inputter, the memory, and the display, to:
  receive a first user voice, through the microphone, to perform an operation according to the first user voice,
  based on receiving a user command through the inputter within a first threshold time from receiving the first user voice, identify a misrecognition has occurred involving performing of the operation according to the first user voice, the first user voice and the user command being received by the processor through different input methods,
  store information of the operation performed according to the first user voice in association with user response information including the received user command in the memory, receive a second user voice through the microphone, perform an operation according to the second user voice, and identify whether the second user voice is associated with the first user voice based on a type of the operation according to the first user voice and a type of the operation according to the second user voice, and control the display to provide guide information inducing an operation according to the user command in response to the second user voice based on the user response information stored in the memory upon the first user voice and the second user voice being identified as being identical.

2. The electronic apparatus of claim 1, wherein the processor is further configured to:

based on receiving the second user voice through the microphone within a second threshold time from when the operation according to the first user voice was performed, identify a type of the second user voice, and based on the type of the second user voice being a predetermined type and the user command being received, store the information on the operation according to the first user voice and the user response information including the user command in the memory.

3. The electronic apparatus of claim 2, wherein the processor is further configured to:

based on receiving the user command after the second user voice of the predetermined type was received, store the information on the operation according to the first user voice and the user response information including the user command in the memory.

4. The electronic apparatus of claim 2, wherein the second user voice of the predetermined type is a user voice including a word indicating a negative emotion.

5. The electronic apparatus of claim 1, wherein the processor is further configured to:

control the display to display a content according to the second user voice and display the guide information to be overlaid on the content.

6. The electronic apparatus of claim 5, wherein the processor is further configured to:

stop reproduction of the content while the guide information is displayed.

7. The electronic apparatus of claim 1, wherein the processor is further configured to:

based on receiving the second user voice in a state wherein a number of times that the user response information was stored in the memory is greater than or equal to a predetermined number of times, perform an operation according to the user command.

8. The electronic apparatus of claim 1, wherein the guide information includes at least one of a message inducing an operation according to the user command or an item for executing an operation according to the user command.

9. The electronic apparatus of claim 1, wherein the processor is further configured to:

based on the user command not being received through the inputter within a third threshold time after the guide information was provided, delete the user response information according to the first user voice from the memory.

10. The electronic apparatus of claim 1, further comprising:

a communication interface, wherein the processor is configured to, based on receiving the user command, control the communication interface to transmit the information of the operation according to the first user voice and the user command to a server, receive the user response information from the server through the communication interface, and store the received user response information in the memory.

11. The electronic apparatus of claim 1, wherein the information on the operation according to the first user voice includes information on a type of an operation that the electronic apparatus will perform based on the first user voice.

12. A method for controlling an electronic apparatus, the method comprising:

based on receiving a first user voice, perform an operation according to the first user voice;

based on receiving a user command within a first threshold time from when the first user voice was received, identify a misrecognition has occurred involving performing of the operation according to the first user voice, the first user voice and the user command being received through different input methods;

store information of the operation performed according to the first user voice in association with user response information including the user command;

based on receiving a second user voice, performing an operation according to the second user voice, identify whether the second user voice is associated with the first user voice based on a type of the operation according to the first user voice and a type of the operation according to the second user voice; and provide guide information inducing an operation according to the user command in response to the second user voice based on the user response information upon the first user voice and the second user voice being identified as being identical.

13. The method of claim 12, further comprising:

based on receiving the second user voice within a second threshold time from when the operation according to the first user voice was performed, identifying a type of the second user voice, wherein based on the type of the second user voice being a predetermined type and the user command being received, storing the information on the operation according to the first user voice and the user response information including the user command.

14. The method of claim 13, wherein based on receiving the user command after the second user voice of the predetermined type was received, storing the information on the operation according to the first user voice and the user response information including the user command.

15. The method of claim 13, wherein the second user voice of the predetermined type is a user voice including a word indicating a negative emotion.

* * * * *